(12) United States Patent
Heo et al.

(10) Patent No.: US 9,590,904 B2
(45) Date of Patent: Mar. 7, 2017

(54) FAST SOFTWARE L2 SWITCHING USING A CACHING TECHNIQUE

(71) Applicant: VMware, Inc., Palo Alto, CA (US)

(72) Inventors: Jin Heo, Mountain View, CA (US); Jui-Ting Weng, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 274 days.

(21) Appl. No.: 14/566,405

(22) Filed: Dec. 10, 2014

(65) Prior Publication Data

US 2016/0173379 A1 Jun. 16, 2016

(51) Int. Cl.
*H04L 12/50* (2006.01)
*H04L 12/747* (2013.01)
*H04L 12/741* (2013.01)

(52) U.S. Cl.
CPC .......... *H04L 45/742* (2013.01); *H04L 45/745* (2013.01)

(58) Field of Classification Search
CPC ............................ H04L 45/742; H04L 45/745
USPC ................................ 370/392, 391, 401, 389
See application file for complete search history.

(56) References Cited

U.S. PATENT DOCUMENTS

2014/0153489 A1* 6/2014 Perras .................... H04W 60/00
370/328
2014/0341109 A1* 11/2014 Cartmell ............... H04L 45/308
370/328

* cited by examiner

*Primary Examiner* — Dang Ton

(57) ABSTRACT

In a system that includes a physical forwarding element (PFE), the mapping of each possible destination MAC address to a destination port number of the PFE is stored in a mapping table. A destination port number on the PFE is identified for a first packet in a sequence of packets arrived at a source port of the PFE by searching the mapping table and stores the destination port number in a caching table. For each packet after the first packet, when the destination MAC address of the packet matches the destination MAC address stored in the caching table, the destination port number stored in the caching table is used as the destination port number of the packet. Otherwise, a destination port number for the packet is identified by searching the mapping table and the destination port number stored in the caching table is replaced with the identified destination port number.

21 Claims, 10 Drawing Sheets

FAST SOFTWARE L2 SWITCHING USING A CACHING TECHNIQUE

BACKGROUND

Virtual switches are an essential part of realizing networking virtualization. Virtual switches interconnect virtual machines residing on the same host without the need of additional networking hardware. They are also used to connect the virtual machines to the physical network.

The main and basic function of virtual switches is the same as hardware switches, namely layer 2 switching. When a packet arrives at an ingress port of the switch, the switch forwards the packet to an egress port based on the destination MAC addresses and optionally VLAN ID.

Hardware switches maintain a table that maps destination MAC and VLAN ID to the egress port. When a packet comes in, the switch looks for a match in the table with destination MAC and VLAN ID as a key. If a match is found, the switch sends out the packet through the destination port specified in the table entry. In the hardware, this table lookup operation is very fast using a special type of memory called Content Addressable Memory (CAM). With the use of CAM, the lookup is done in a single operation (lookup). Performing the above-explained switching operation in pure software using commodity servers is inherently slower without the lack of specialized hardware support.

BRIEF SUMMARY

Virtual switches interconnect virtual machines (VMs) residing on the same host without the need of additional networking hardware. Virtual switches are also used to connect the VMs to the physical network. When a packet arrives at an ingress port of the switch, the switch forwards the packet to an egress port, based on the destination media access control (MAC) addresses and optionally virtual local area network identification (VLAN ID).

There are various ways to implement this switching operation in pure software. For instance, a virtual switch can implement Open Systems Interconnection (OSI) model Layer 2 (L2) switching in software by using commodity operating system and hardware. The MAC address table is stored in RAM. Some embodiments use a hash table to implement the MAC address table. Using a hash table for the MAC address table, however, has its own issues. A hash value has to be calculated that is time consuming and hash value collisions also need to be taken care of.

Some embodiments use a linked list to implement a MAC address table stored in RAM. Each entry in the linked list has a mapping of destination MAC and destination port. VLAN ID is associated with a port in the switch. Since a linked list is used for implementing the MAC address table, a linear search through the linked list is required to find a match and figure out the destination port. This linear search is done for every packet, which can hurt performance.

In addition to a table lookup, virtual switches perform many other checks and operations for each packet. For instance, the virtual switch has to figure out if the packet is multicast or not and performs special operations if it is. Furthermore, since everything is done in software, it can involve data structure allocation, initialization, and/or cleanup for each packet when performing the switching operation.

Some embodiments provide an optimization that uses a caching technique that reuses the switching results to improve the speed of L2 switching operation in the software switch. In L2 switches, any two packets with the same destination MAC address and VLAN ID are forwarded to the same destination ports. Some embodiments cache the dispatching results of packets and use the cached information for the consecutive packets with the same destination MAC and VLAN ID. Packets from the same port are usually processed in a batch to reduce processing cost in virtualization software. The packets are delivered in a batch from VMs and uplinks to the switch and from the switch to VMs and uplinks. Because of this batching, packets belonging to the same connection (i.e. same destination MAC addresses and VLAN ID) are likely clustered.

Some embodiments store and reuse the L2 switching results for consecutive packets with the same destination MAC address and VLAN ID. By reusing the switching results, the lookup in the MAC address table and all other checks and operations that are performed against each packet are bypassed. Because the caching is only done for consecutive packets, there is no need for a separate hash table for storing the L2 switching results. This approach is very simple and the overhead is therefore minimal.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments cache the dispatching results of packets and use the cached information for the consecutive packets with the same destination MAC and VLAN ID. The packets are delivered in a batch from VMs and uplinks to the switch and from the switch to VMs and uplinks. Because of this batching, packets belonging to the same connection (i.e. same destination MAC addresses and VLAN ID) are likely clustered. The L2 switching results for consecutive packets with the same destination MAC address and VLAN ID are stored and reused. The optimization improves the speed of L2 switching operation in the software switch in a virtualization environment.

Figure 1:
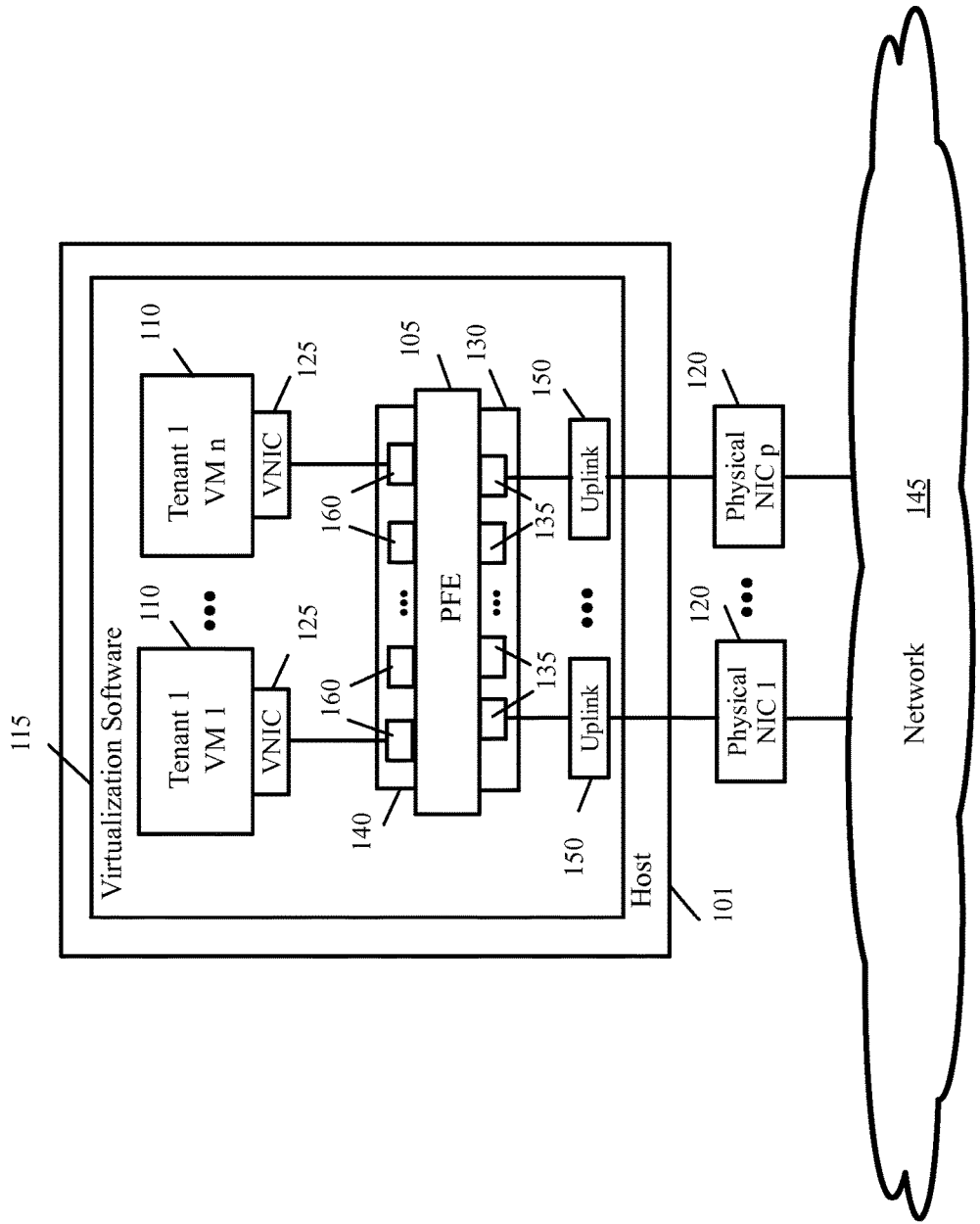
FIG. 1 conceptually illustrates a virtualized infrastructure domain in some embodiments of the invention.

Virtualization is the ability to simulate a hardware platform, such as a server, storage device or network resource, in software. A VM is a software implementation of a machine such as a computer. FIG. 1 conceptually illustrates a virtualized infrastructure domain in some embodiments of the invention. The virtualized infrastructure domain is in some embodiments a virtualized infrastructure that is managed by a single cloud management system. The virtualized infrastructure domain includes a set of host machines 101, one of which is shown in FIG. 1. Each host can host one or more tenants, each tenant can have one or more VMs. VMs 110 of one tenant are shown in FIG. 1. The host machines also host a set of services that provide different services. The term cloud service refers to services (such as computing, storage, etc.) provided in a distributed manner over a network.

As shown, the host 101 includes virtualization software (sometimes referred to as a hypervisor) 115. The virtualization software 115 is representative of the various types of virtualization software that may operate on hosts in such a virtualized infrastructure (e.g., virtual machine monitor, etc.).

The VMs of each tenant form a logical network (also referred to as private network or virtual network). The logical network is identified by a logical network identifier (also known as virtual network identifier or VNI). Each logical network is configured by a tenant. The logical network is an abstraction of a physical network and may provide a virtual Layer 2 (or data link layer) for services such as encapsulation and decapsulation of network layer data packets into frames, frame synchronization, medial access control, etc. The logical network may span one or more physical networks and be organized independent of the underlying physical topology and organization of the physical networks.

In some embodiments, the virtualization software 115 includes one or more software forwarding elements 105 such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. A PFE forwards packets in a physical network whether or not it is implemented in software while a LFE forwards packets in a logical network, which is logically decoupled or abstracted from the physical network. In other words, the software forwarding elements are referred to as PFEs because they exist and operate in the physical world, whereas an LFE is a logical representation of a forwarding element that is presented to a user when designing a logical network.

In each host 101, each PFEs 105 connects to one or more physical network interface controllers (PNICs) 120 to send outgoing packets and to receive incoming packets through a physical network 145. As shown, the PFE 105 is defined to include one or more ports 135 (or a port group 130) through which it connects to uplinks 150 and the physical NICs 120 to send and receive packets.

Each PFE 105 is also defined to have a set of virtual ports 160 (or a virtual port group 140) to connect to VMs 110 through virtual NICs (VNICs) 125 to the PFE 105. A port group is a group of ports that have the same configuration. An uplink 150 is a module that relays packets between the PFE 105 and the physical NIC 120 in order to perform various packet processing functions on incoming and outgoing traffic.

I. Using Cached Dispatching Data for Consecutive Packets

PFEs perform L2 switching functions. When a packet arrives at the PFE, the PFE uses the destination MAC address and optionally the VLAN ID to determine the destination port number. When the packet arrives from a VM, the ingress (or source) port is one of virtual ports 160 shown in FIG. 1 and the egress (or destination) port is either another one of the virtual ports 160 or one of the uplink ports 135 depending on the destination MAC address and VLAN ID. Conversely, when a packet arrives from a PNIC, the source port is one of the uplink ports 135 and the destination port is one of the virtual ports 160.

There are different techniques for determining the destination port number for L2 switching including the use of table lookups and hashing. Some embodiments store the destination MAC address, VLAN ID, and destination port number of a packet in order to avoid repetitive table lookup or hashing operations. If the next packet arrived at the same input port has the same destination MAC address and VLAN ID, the packet is dispatched to the same destination port as the previous packet to expedite dispatching of the packet.

A. Identifying the Destination Port Number of a Packet

Figure 2:
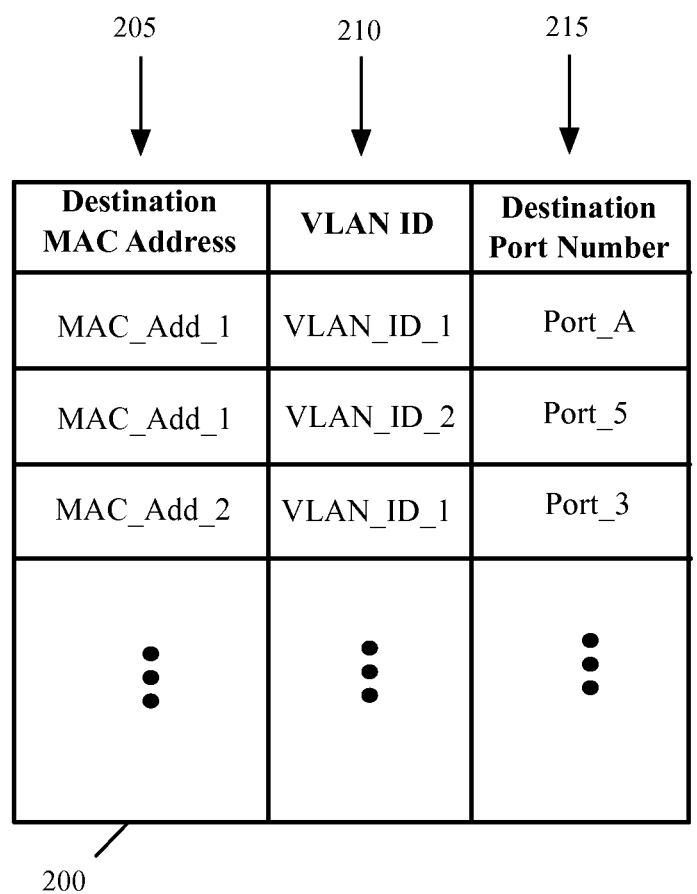
FIG. 2 conceptually illustrates the mapping of destination MAC address and VLAN ID to destination port number in some embodiments of the invention.

FIG. 2 conceptually illustrates the mapping of destination MAC address and VLAN ID to destination port number in some embodiments of the invention. As shown, each pair of destination MAC address 205 and VLAN ID 210 in the table 200 is mapped to a unique port number 215. Although table 200 includes both destination MAC address and VLAN ID to determine the destination port number, some embodiments only use the destination MAC address to determine the destination port number. The following discussions refer to the use of both destination MAC address and VLAN ID for determining the destination port number. One of ordinary skill in the art will realize that the same discussions are readily applicable to the embodiments that do not use VLAN ID to determine the destination port number by using only destination MAC address instead of destination MAC address and VLAN ID.

Figure 3:
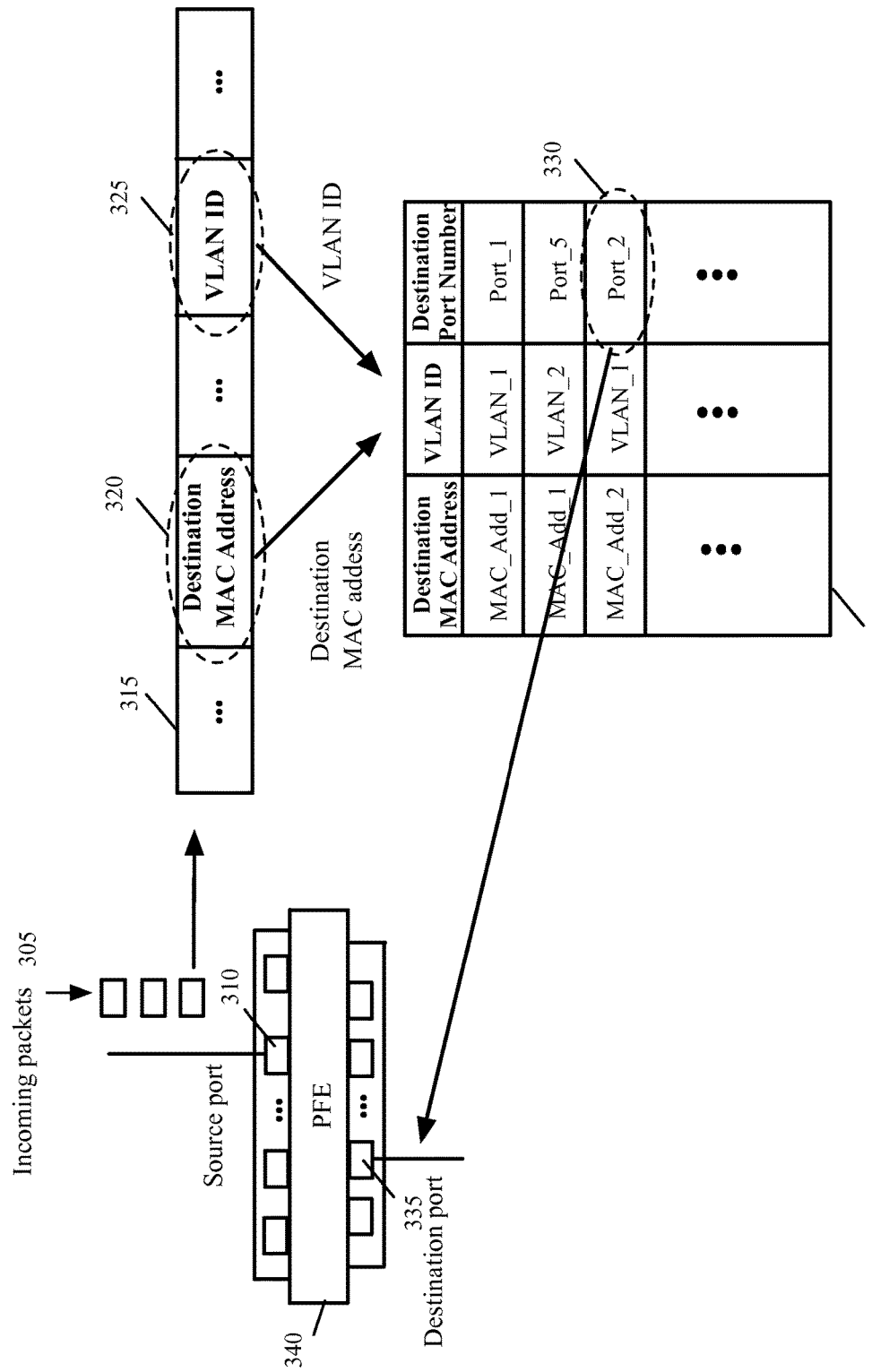
FIG. 3 illustrates a prior art technique for using the table of FIG. 2 to determine destination address of an incoming packet.

FIG. 3 illustrates a prior art technique for using the table of FIG. 2 to determine destination address of an incoming packet. As shown, a series of packets 305 arrive at a source port 310. Each packet 315 includes a destination MAC address 320 and a VLAN ID 325 field.

The destination MAC address 320 and a VLAN ID 325 of each packet are used to perform a table lookup into table 200 to identify a destination port 330. For instance, the table can be used as a linked list to perform the lookup. The destination port 330 found in the table 200 is used as the destination port 335 of the PFE 340 to dispatch the packet. The same process is repeated for each incoming packet 305.

Figure 4:
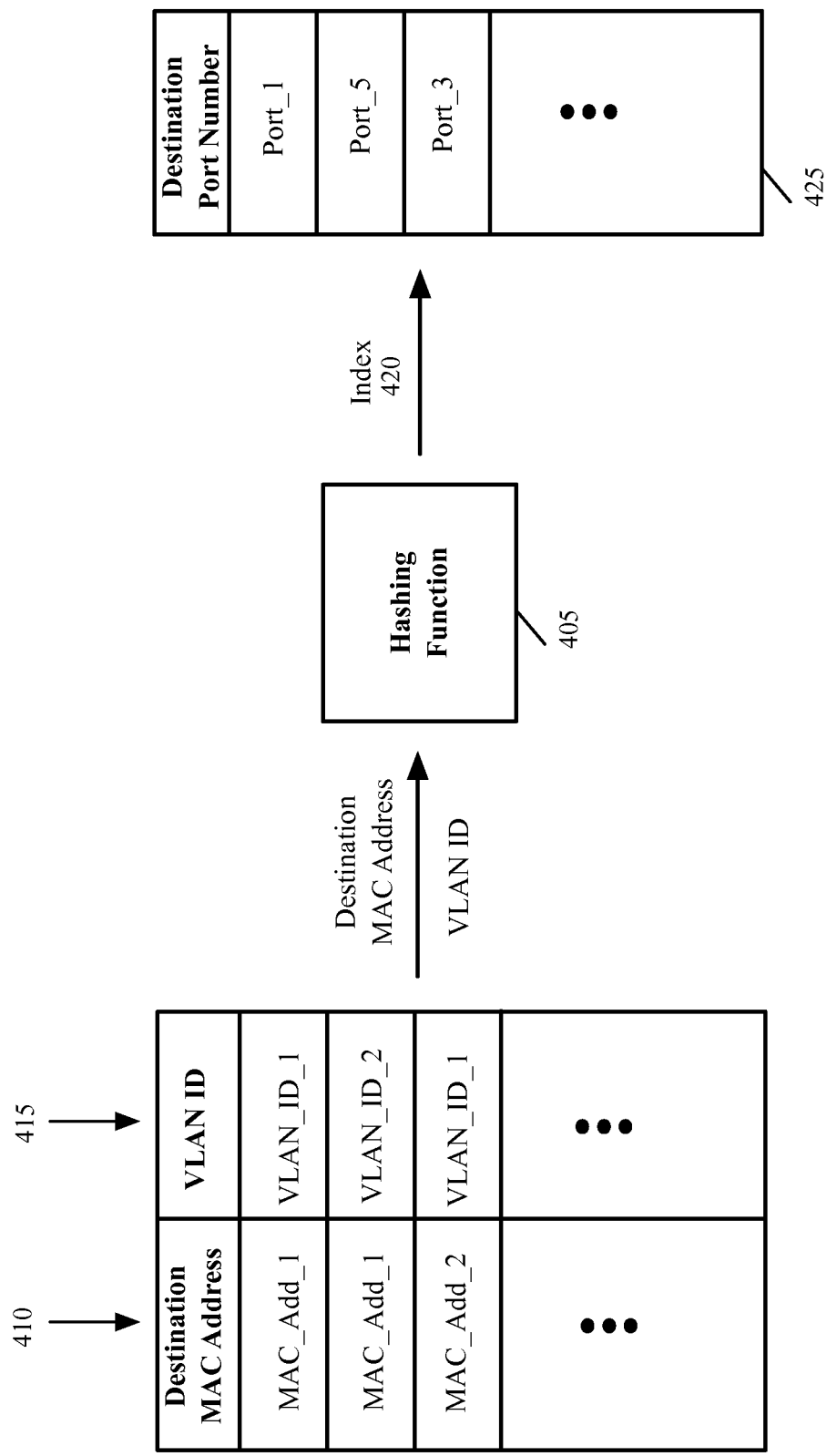
FIG. 4 conceptually illustrates an alternative way of mapping the destination MAC address and VLAN ID to destination port number in some embodiments of the invention.

FIG. 4 conceptually illustrates an alternative way of mapping the destination MAC address and VLAN ID to destination port number in some embodiments of the invention. As shown, a hash function 405 hashes each pair of destination MAC address 410 and VLAN ID 415 is hashed into a hash value that is used as an index 450 into a hash table 425.

A port number that corresponds to a destination MAC address and VLAN ID pair is stored in the table 425 in the location that is indexed by the hash value of the destination MAC address and VLAN ID pair. If two pairs of destination MAC address and VLAN ID result in the same hash value, they create a collision. The port number associated with each pair is determined by using different collision resolution techniques such as chaining, chaining with linked list, etc., as well known in the art.

Figure 5:
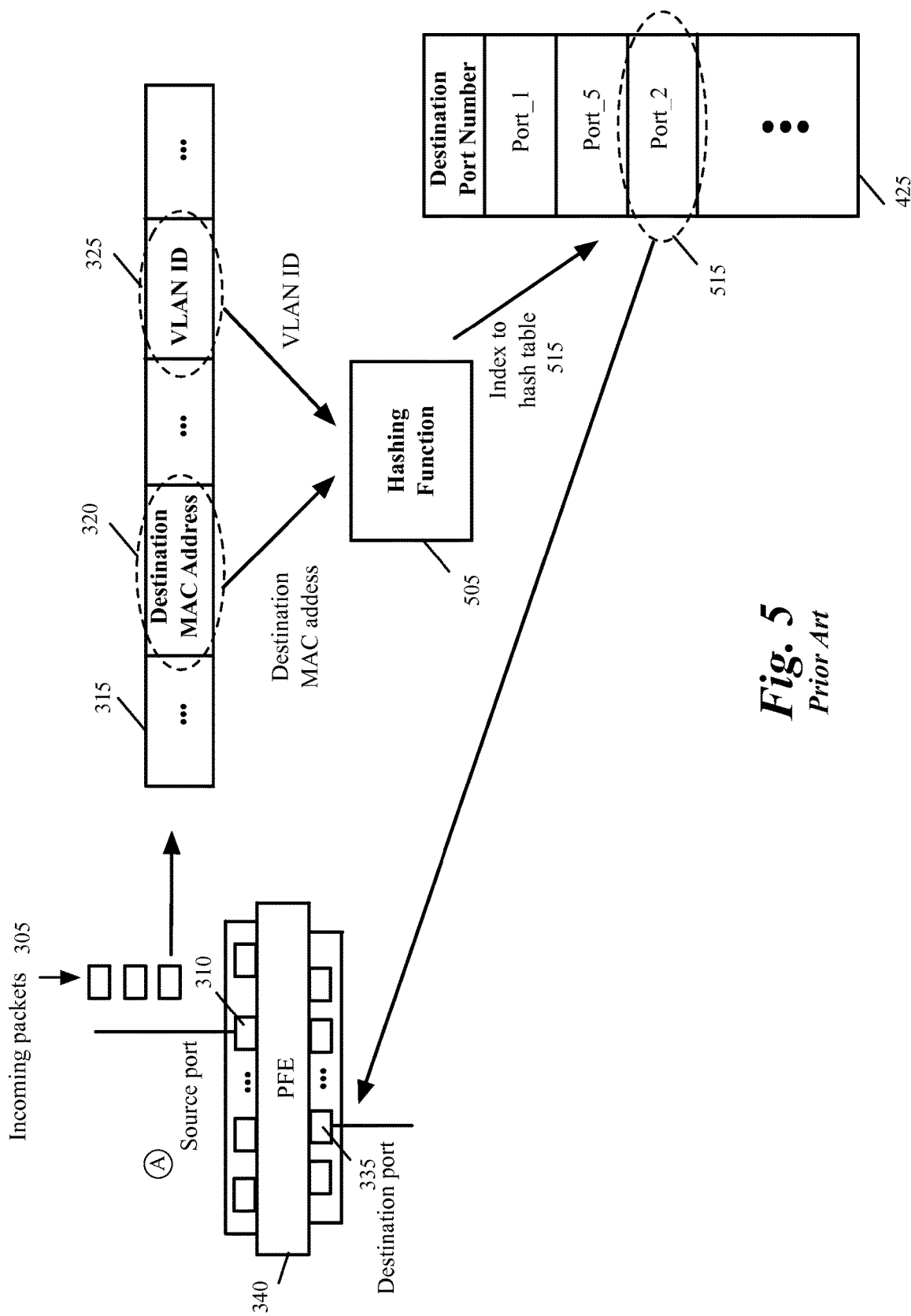
FIG. 5 illustrates a prior art technique for using the table of FIG. 4 to determine destination address of an incoming packet.

FIG. 5 illustrates a prior art technique for using the table of FIG. 4 to determine destination address of an incoming packet. As shown, a series of packets 305 arrive at a source port 310. Each packet 315 includes a destination MAC address 320 and a VLAN ID 325 field.

The destination MAC address 320 and a VLAN ID 325 of each packet are used as inputs to the hash function 505 to determine a hash value that is used as an index 510 into the hash table 425 to identify a destination port number 515. The destination port 515 found in the table 425 is used as the destination port 335 of the PFE 340 to dispatch the packet. The same process is repeated for each incoming packet 305.

B. Reusing the Destination Port Number of a Previous Packet

Figure 6:
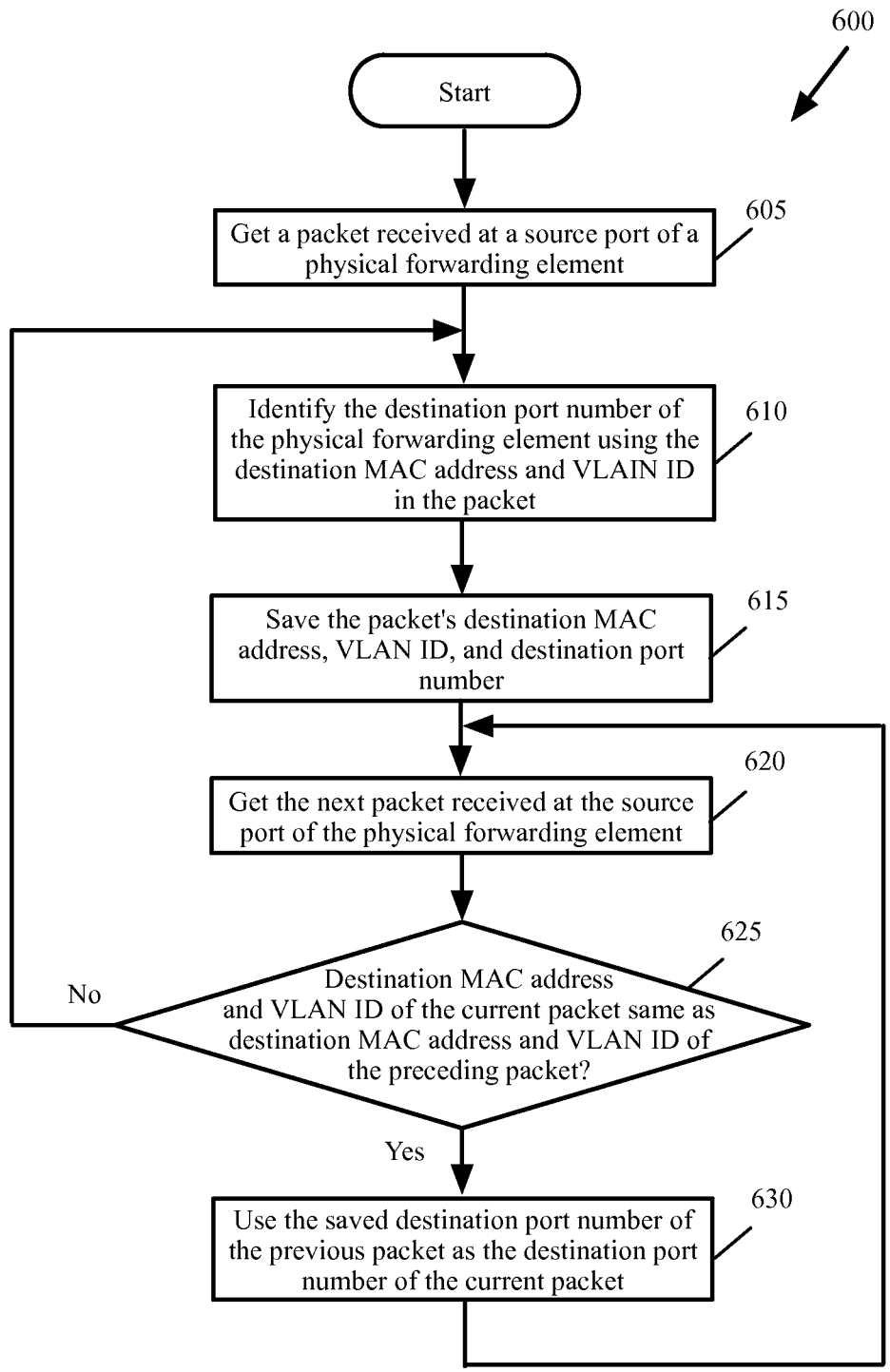
FIG. 6 conceptually illustrates a process for using the port number of a previous packet to speed up dispatching of packets at a PFE in some embodiments of the invention.

Some embodiments provide improvements to prior art techniques to speed up the process for determining the destination port number of the incoming packets at an L2 switch. FIG. 6 conceptually illustrates a process 600 for using the port number of a previous packet to speed up dispatching of packets at a PFE in some embodiments of the invention. Process 600 is performed, for example, by the driver of a PFE. The process is performed for each transmit packet thread. A transmit packet thread is a sequence of packets that is received at a source (ingress) port of the PFE and has to be transmitted through a destination (egress) port of the PFE. Some embodiments maintain one transmit packet thread per ingress port at each time.

Figure 7:
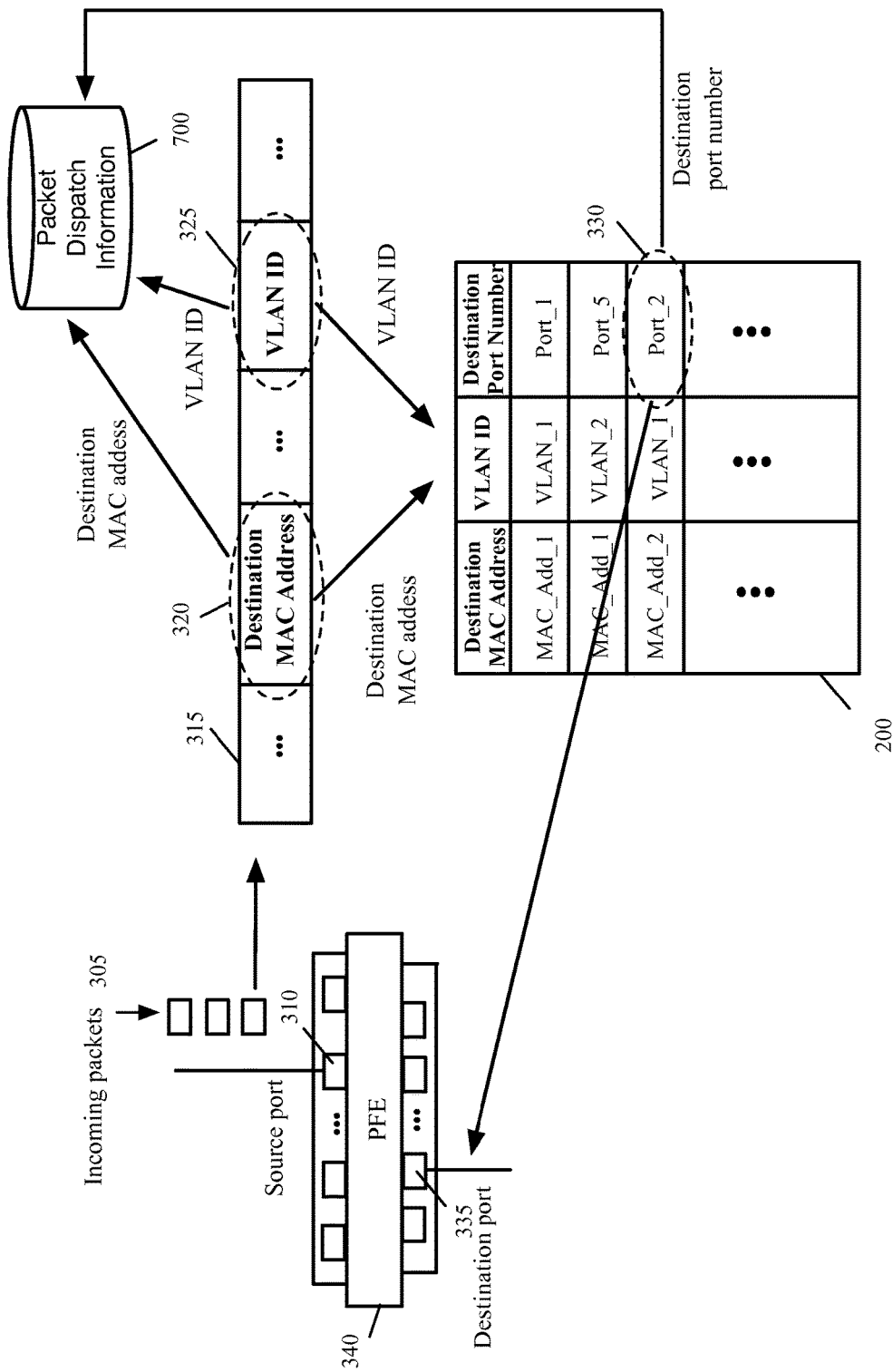
FIG. 7 conceptually illustrates using a combination of stored destination address of a previous packet and a lookup table to determine the destination port number of incoming packets in some embodiments of the invention.
Figure 8:
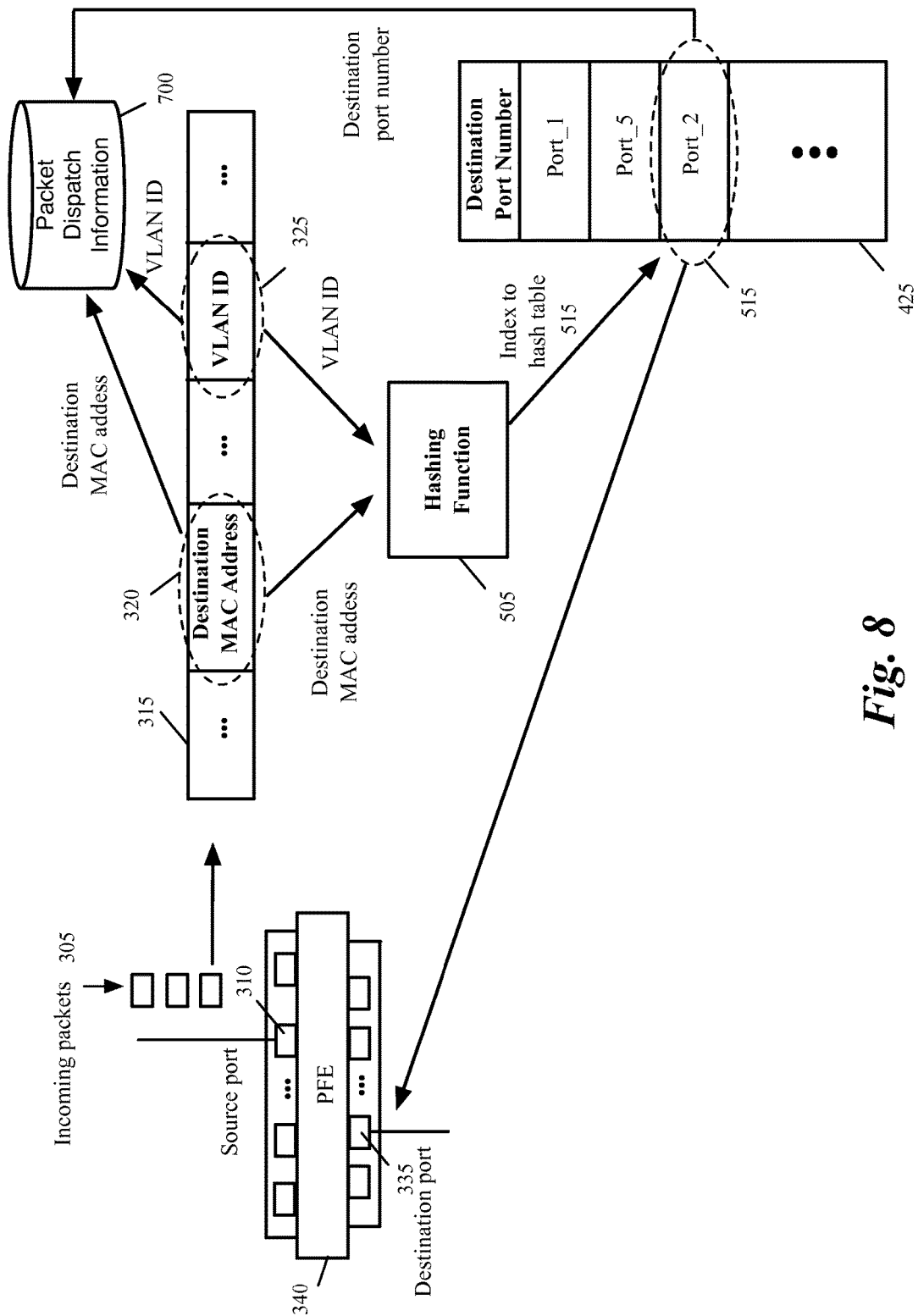
FIG. 8 conceptually illustrates using a combination of stored destination address of a previous packet and a hash table to determine the destination port number of incoming packets in some embodiments of the invention.

Process 600 is described by referencing FIGS. 7 and 8. FIG. 7 conceptually illustrates using a combination of stored destination address of a previous packet and a lookup table to determine the destination port number of incoming packets in some embodiments of the invention. FIG. 8 conceptually illustrates using a combination of stored destination address of a previous packet and a hash table to determine the destination port number of incoming packets in some embodiments of the invention.

As shown in FIG. 6, process 600 gets (at 605) a packet that is received at the source port of a physical forwarding element. In some embodiments, when a group of one or more packets arrive at the source port of a PFE, the packets are stored in a queue and are removed from the queue one at a time to determine their destination port addresses. If the packets are received from a VM, the packets are stored in a VNIC input queue. If the packets are received from a PNIC, the packets are stored in an uplink input queue.

Next, the process identifies (at 610) the destination port number of the physical forwarding element using the destination MAC address and VLAN ID of the packet. For the first packet, the destination port number is identified by using a technique such as table lookup or hashing. For instance, as shown in FIG. 7, the destination MAC address 320 and VLAN ID 325 of the packet 315 are used to perform a table lookup in table 200 to find a port number 330. Port number 330 is in turn used as the destination port number 335 on the PFE 340 to dispatch the packet.

Similarly, in FIG. 8, the destination MAC address 320 and VLAN ID 325 of the packet 315 are used as inputs to the hash function 505 to identify an index 515 to hash table 425 to identify a destination port number 515. The destination port number is used as the port number 335 of the PFE 340 to dispatch the packet.

Referring back to FIG. 6, the process then stores (at 615) the packet's destination MAC address, VLAN ID, and the destination port number for the current packet sequence (or thread) received at the source port. Some embodiments also store other L2 switching results such as whether the packet is a multicast, unicast, or broadcast. As shown in FIGS. 7 and 8, the destination MAC address, VLAN ID, and destination port number of the current packet received at source port 310 is stored in a temporary storage 700 such as RAM or cache. Cache is a block of high speed memory which is implemented either within a processing unit (e.g., L1 cache) or in a high speed read-write memory area (e.g., L2 cache).

Figure 9:
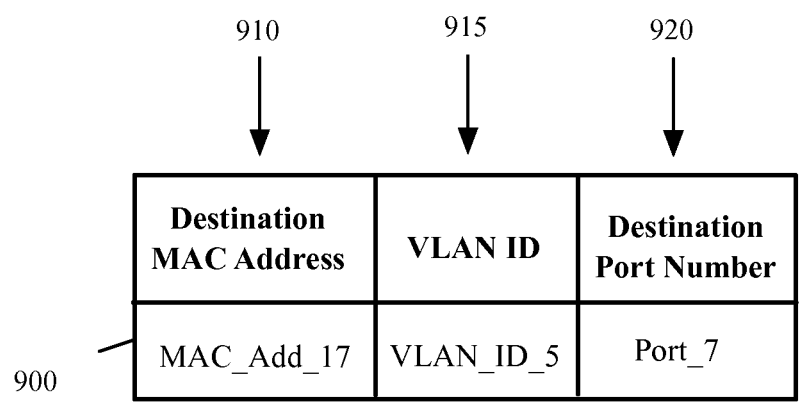
FIG. 9 conceptually illustrates storing of the destination MAC address, VLAN ID, and destination port number of incoming packets in some embodiments of the invention.

In some embodiments, the cached values for each particular thread are stored as local variables of the particular thread. Since each thread stores its own cached values in the stack, the cached values are quickly accessible during the processing of the thread. FIG. 9 conceptually illustrates storing of the destination MAC address, VLAN ID, and destination port number of incoming packets for a thread in some embodiments of the invention. As shown, destination MAC address 910, VLAN ID 915, and the destination port number 920 of the current packets for the transmit packet thread are stored in a corresponding table 900. Other L2 switching information such as whether a packet is multicast, unicast, or broadcast are also stored in table 900 and are not shown in FIG. 9 for brevity. One of ordinary skill in the art will realize that the same discussions are readily applicable to the embodiments that do not use VLAN ID. These embodiments do not store the VLAN ID for each thread in the cache.

Once the destination port number of a packet is determined, some embodiments output the packet through the identified destination port number of the PFE. Other embodiments, store a group of packets and output the group of packets together.

Referring back to FIG. 6, the process then gets (620) the next packet that is received at the source port of the physical forwarding element (i.e., the next packet in the same packet thread). The process then determines (at 625) whether the destination MAC address and VLAN ID of the current packet is the same as the destination MAC address and VLAN ID of the preceding packet stored in the table 900. If not, the process proceeds to 610 to determine the destination port number of the packet by using the MAC address and VLAN ID included in the packet. The cached information for the current thread stored in table 900 is also disregarded in some embodiments and is overwritten (in operation 615) by the information for the current packet. In other words, these embodiments stored the destination port number and other L2 switching results of the last packet in a sequence and use it for consecutive packets.

Otherwise, when the destination MAC address and VLAN ID of the current packet is the same as the destination MAC address and VLAN ID of the preceding packet stored in the table 900, the process uses the destination port number of the previous packet stored in table 900 as the destination port number of the current packet. Thereby, the time consuming steps of identifying the destination port number by computing hash values or searching a tables such as table 200 are avoided.

Since table 900 only stores the MAC address and VLAN ID of the last packet for each thread (or each source port number), searching table 900 much faster comparing to searching table 200, which stores possible every combination of MAC address/VLAN ID pairs and their associated destination port numbers.

The following pseudo code illustrates an example of how destination port numbers are stored in some embodiments of the invention.

```
while (get packet) /* Get the next packet in the thread */
    /* Use the stored port number if destination MAC address and VLAN
    ID
        match the destination address and VLAN ID of the previosu
        packet */
    if (dest_MAC_add = previous_packet_dest_MAC) and
        (VLAN _ID = previous_packet_VLAN_ID)
    then
        dest_port_no = previous_packet_dest_port_no
        return
    else
        /* Determine the destination port number based on the
        MAC address and VLAN ID of the current packet */
        dest_port_no = determine_dest_port_no (dest_MAC_add,
        VLAIN_ID)
        return
end while
```

In the above pseudo code, dest_MAC_add is the destination MAC address included in the current packet, VLAN_ID is the VLAN ID included in the current packet, previous_packet_dest_MAC is the cached destination MAC address of the previous packet, previous_packet_VLAN_ID is the cached VLAIN ID of the previous packet, dest_port_no is the destination port number determined for the current packet, and previous_packet_dest_port_no is the cached destination port number of the previous packet. The determine_dest_port_no function determines the destination port number of the current packet by performing hashing or table lookup of all destination MAC address/VLAIN ID pairs.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
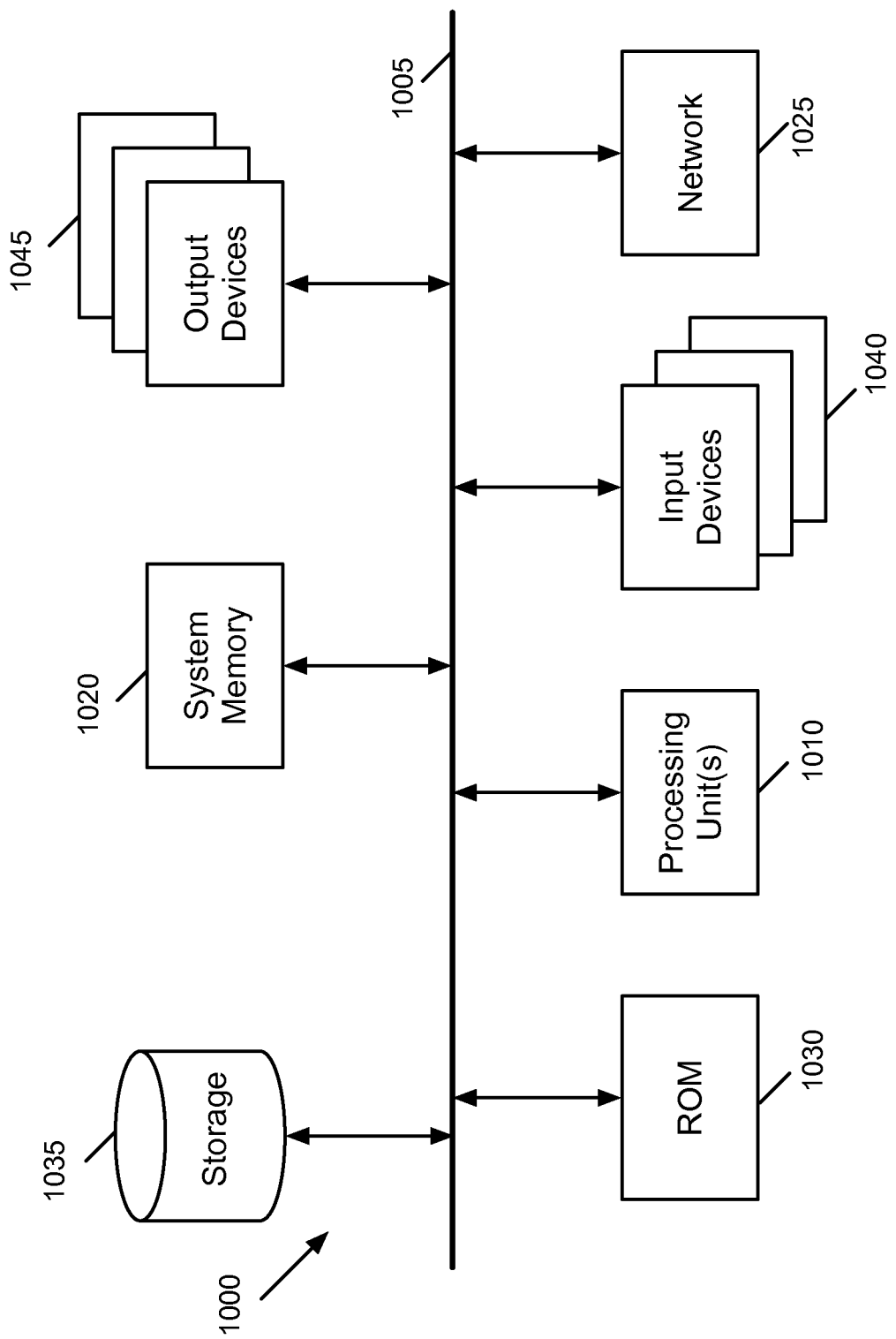
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, compute manager, network manager, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1020, a read-only memory (ROM) 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1020 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures including FIG. 6 conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of optimizing processing of consecutive packets with a same destination address in a sequence of packets in a system comprising a physical host, the physical host comprising virtualization software comprising a physical forwarding element (PFE), each packet comprising a destination media access control (MAC) address, the method comprising:
   storing a mapping of each possible destination MAC address to a destination port number of the PFE in a mapping table;
   identifying a destination port number on the PFE for a first packet in the sequence of packets arrived at a source port of the PFE by searching the mapping table;
   storing the destination port number of the first packet in a caching table;

for each packet after the first packet in the sequence of packets:
when the destination MAC address of the packet matches the destination MAC address stored in the caching table, using the destination port number stored in the caching table as the destination port number of the packet; and
when the destination MAC address of the packet does not match the destination MAC address stored in the caching table, (i) identifying a destination port number for the packet by searching the mapping table and (ii) replacing the destination port number stored in the caching table with the destination port number of the packet identified by searching the mapping table.

2. The method of claim 1, wherein the mapping table stores a plurality of destination port numbers indexed by a hash of a plurality of destination MAC addresses, wherein searching the mapping table comprises calculating a hash value of the destination MAC address of the packet and using the hash value as an index to the mapping table to find a destination port number for the packet.

3. The method of claim 1, wherein searching the mapping table comprises comparing the destination MAC address of the packet with each destination MAC address stored in the mapping table until a match is found.

4. The method of claim 1, wherein the PFE comprises a first set of ports connected to a set of data compute nodes (DCNs) through a set of virtual network interface controllers (VNICs) and a second set of ports connected to a set of physical network interface controllers (PNICs), wherein when the source port of the PFE is in the second set of ports, the destination port of the PFE is one of a port in the first set of the ports.

5. The method of claim 4, wherein the PFE comprises a first set of ports connected to a set of data compute nodes (DCNs) through a set of virtual network interface controllers (VNICs) and a second set of ports connected to a set of physical network interface controllers (PNICs), wherein when the source port of the PFE is in the first set of ports, the destination port of the PFE is one of a port in the second set of the ports and a port in the first set of ports different than the source port.

6. The method of claim 5, wherein a DCN is a virtual machine (VM).

7. The method of claim 1, wherein the PFE is a virtual switch.

8. A non-transitory machine readable medium storing a program for packet processing in a system comprising a physical host, the physical host comprising virtualization software comprising a physical forwarding element (PFE), each packet comprising a destination media access control (MAC) address, the program executable by at least one processing unit, the program comprising sets of instructions for:
storing a mapping of each possible destination MAC address to a destination port number of the PFE in a mapping table;
identifying a destination port number on the PFE for a first packet in the sequence of packets arrived at a source port of the PFE by searching the mapping table;
storing the destination port number of the first packet in a caching table;
for each packet after the first packet in the sequence of packets:
when the destination MAC address of the packet matches the destination MAC address stored in the caching table, using the destination port number stored in the caching table as the destination port number of the packet; and
when the destination MAC address of the packet does not match the destination MAC address stored in the caching table, (i) identifying a destination port number for the packet by searching the mapping table and (ii) replacing the destination port number stored in the caching table with the destination port number of the packet identified by searching the mapping table.

9. The non-transitory machine readable medium of claim 8, wherein searching the mapping table comprises comparing the destination MAC address of the packet with each destination MAC address stored in the mapping table until a match is found.

10. The non-transitory machine readable medium of claim 8, wherein the mapping table stores a plurality of destination port numbers indexed by a hash of a plurality of destination MAC addresses, wherein searching the mapping table comprises calculating a hash value of the destination MAC address of the packet and using the hash value as an index to the mapping table to find a destination port number for the packet.

11. The non-transitory machine readable medium of claim 8, wherein the PFE comprises a first set of ports connected to a set of data compute nodes (DCNs) through a set of virtual network interface controllers (VNICs) and a second set of ports connected to a set of physical network interface controllers (PNICs), wherein when the source port of the PFE is in the second set of ports, the destination port of the PFE is one of a port in the first set of the ports.

12. The non-transitory machine readable medium of claim 11, wherein the PFE comprises a first set of ports connected to a set of data compute nodes (DCNs) through a set of virtual network interface controllers (VNICs) and a second set of ports connected to a set of physical network interface controllers (PNICs), wherein when the source port of the PFE is in the first set of ports, the destination port of the PFE is one of a port in the second set of the ports and a port in the first set of ports different than the source port.

13. The non-transitory machine readable medium of claim 12, wherein a DCN is a virtual machine (VM).

14. The non-transitory machine readable medium of claim 8, wherein the PFE is a virtual switch.

15. A physical computing device comprising:
a set of processing units;
virtualization software comprising a physical forwarding element (PFE); and
a non-transitory machine readable medium storing a program packet processing, each packet comprising a destination media access control (MAC) address and a virtual local area network identifier (VLAN ID), the program for execution by the set of processing units, the program storing set of instructions for:
storing a mapping of each possible destination MAC address to a destination port number of the PFE in a mapping table;
identifying a destination port number on the PFE for a first packet in the sequence of packets arrived at a source port of the PFE by searching the mapping table;
storing the destination port number of the first packet in a caching table;
for each packet after the first packet in the sequence of packets:

when the destination MAC address of the packet matches the destination MAC address stored in the caching table, using the destination port number stored in the caching table as the destination port number of the packet; and when the destination MAC address of the packet does not match the destination MAC address stored in the caching table, (i) identifying a destination port number for the packet by searching the mapping table and (ii) replacing the destination port number stored in the caching table with the destination port number of the packet identified by searching the mapping table.

16. The physical computing device of claim 15, wherein searching the mapping table comprises comparing the destination MAC address of the packet with destination MAC address stored in the mapping table until a match is found.

17. The physical computing device of claim 15, wherein the mapping table stores a plurality of destination port numbers indexed by a hash of a plurality of destination MAC addresses, wherein searching the mapping table comprises calculating a hash value of the destination MAC address of the packet and using the hash value as an index to the mapping table to find a destination port number for the packet.

18. The physical computing device of claim 15, wherein the PFE comprises a first set of ports connected to a set of data compute nodes (DCNs) through a set of virtual network interface controllers (VNICs) and a second set of ports connected to a set of physical network interface controllers (PNICs), wherein when the source port of the PFE is in the second set of ports, the destination port of the PFE is one of a port in the first set of the ports.

19. The physical computing device of claim 18, wherein the PFE comprises a first set of ports connected to a set of data compute nodes (DCNs) through a set of virtual network interface controllers (VNICs) and a second set of ports connected to a set of physical network interface controllers (PNICs), wherein when the source port of the PFE is in the first set of ports, the destination port of the PFE is one of a port in the second set of the ports and a port in the first set of ports different than the source port.

20. The physical computing device of claim 19, wherein a DCN is a virtual machine (VM).

21. The physical computing device of claim 15, wherein the PFE is a virtual switch.

* * * * *